US009500274B2

(12) United States Patent
Itoo et al.

(10) Patent No.: US 9,500,274 B2
(45) Date of Patent: Nov. 22, 2016

(54) TRANSMISSION APPARATUS

(71) Applicant: KAWASAKI JUKOGYO KABUSHIKI KAISHA, Hyogo (JP)

(72) Inventors: Seiji Itoo, Akashi (JP); Ayumi Hamada, Akashi (JP); Taisuke Morita, Amagasaki (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 292 days.

(21) Appl. No.: 14/263,042

(22) Filed: Apr. 28, 2014

(65) Prior Publication Data

US 2015/0308559 A1 Oct. 29, 2015

(51) Int. Cl.
*F16H 57/04* (2010.01)

(52) U.S. Cl.
CPC .......... *F16H 57/043* (2013.01); *F16H 57/042* (2013.01)

(58) Field of Classification Search
CPC ............. F16H 57/0434; F16H 57/043; F16H 57/0421; F16H 57/042; F16H 57/0424
USPC ....................................... 184/6.12
See application file for complete search history.

(56) References Cited

U.S. PATENT DOCUMENTS

| 4,222,283 | A | * | 9/1980 | Nagy | F16H 3/089 |
|           |   |   |        |      | 184/11.2 |
| 4,231,266 | A | * | 11/1980 | Nishikawa | F16C 33/6659 |
|           |   |   |        |      | 184/11.1 |
| 4,644,815 | A | * | 2/1987 | Kawano | F16H 3/089 |
|           |   |   |        |      | 184/6.12 |
| 8,840,511 | B2 | * | 9/2014 | Seno | F16H 57/0423 |
|           |   |   |        |      | 184/6.12 |
| 8,905,192 | B2 | * | 12/2014 | Araki | F16H 57/0423 |
|           |   |   |        |      | 184/6.12 |
| 2013/0305878 | A1 | * | 11/2013 | Seno | F16H 57/0423 |
|           |   |   |        |      | 74/665 A |
| 2014/0054114 | A1 | * | 2/2014 | Isomura | F16H 57/0423 |
|           |   |   |        |      | 184/6.12 |

FOREIGN PATENT DOCUMENTS

JP 61-12451 4/1986

* cited by examiner

*Primary Examiner* — William E Dondero
*Assistant Examiner* — Mark K Buse
(74) *Attorney, Agent, or Firm* — Wenderoth, Lind, Ponack, L.L.P.

(57) ABSTRACT

A transmission apparatus includes a case, a gear transmission housed in the case, an intra-shaft oil passage formed in a rotating shaft, an oil supplying passage for supplying oil to the intra-shaft oil passage, a guide plate facing an axial end surface of a gear with a predetermined distance in the axial direction of the gear, which is clipped in oil in the case; and an oil passage formed between the one end surface and the guide plate. The oil passage extends along an outer periphery of the one end surface.

6 Claims, 10 Drawing Sheets

TRANSMISSION APPARATUS

BACKGROUND OF THE INVENTION

1. Field of the Invention

The present invention relates to a transmission apparatus and, more particularly, relates to a transmission apparatus including an oil supplying mechanism for introducing oil into an intra-shaft oil passage in a rotating shaft from inside of a case, and then supplying the oil to fitting portions where gears and the like are fitted on an outer peripheral surface of the rotating shaft.

2. Description of the Related Art

Such a mechanism for supplying oil, for example, has been used for lubricating portions where speed-change gears are fitted on a speed-change shaft, in a gear transmission. As a system for supplying the oil into the rotating shaft from outside, there have been a forced-supply system utilizing an oil pump, and a natural-supply system utilizing water-head differential pressure (head differential pressure) in oil. The forced-supply system hardly induces shortage of the amount of supplied oil into the rotating shaft, except in an event of failures of the oil pump, and the like.

However, in the natural-supply system, it is necessary to transfer or lift the oil upwardly from a case to a certain height which will result in a water-head differential pressure in the oil. Japanese Examined Utility Model (Registration) Application Publication No. 61-12451 discloses a lubricating mechanism which supplies oil by utilizing a large-diameter ring gear 201, as illustrated in FIG. 11. The structure illustrated in FIG. 11 will be described briefly. An oil passage is formed in a space between outer teeth 201a of the ring gear 201 and an inside wall surface 202a of a transmission case 202. Oil in the transmission case 202 is transferred or lifted up through the oil passage by rotation of the ring gear 201, and supplied in an oil receiver 203 located in a height position. The oil receiver 203 is communicated with an intra-shaft oil passage 205 of a rotating shaft 204 which is positioned at a level lower than a level of the oil receiver 203.

With respect to the mechanism of FIG. 11, although the oil is transferred upwardly in the space between the outer teeth 201a and the inside wall surface 202a, some or most of the oil flows out laterally in an axial direction from the space along the way between a lower end portion of the ring gear 201 and an upper end portion thereof. Namely, losses of the transferred oil amount will become large, and oil transfer efficiency will become low.

SUMMARY OF THE INVENTION

The present invention was made in view of the above-described problem. It is an object to provide a transmission apparatus capable of increasing the oil flow rate to be transferred by only one gear, reducing outflow amount of the oil, and improving the transfer efficiency of the oil.

In order to solve the above problems, the present invention provides a transmission apparatus comprising: a case; a gear transmission housed in the case; an intra-shaft oil passage formed in at least one rotating shaft of the gear transmission; an oil supplying passage for supplying oil to the intra-shaft oil passage; a guide plate facing one axial end surface of a gear with a predetermined distance in an axial direction of the gear, the gear being clipped into the oil in the case; and an oil passage formed between the one end surface and the guide plate, the oil passage extending along an outer periphery of the one end surface.

The transmission apparatus according to the aspect of the present invention is preferably provided with a configuration as below.

(a) The guide plate includes a recess portion for expanding the oil passage, and the recess portion is formed in an arc-like shape so as to extend along the oil passage.

With above the structure (a), it will become possible to increase the amount of the supplied oil.

(b) The oil passage includes a narrow portion on an upper end of the oil passage, and the upper end is communicated with the oil supply passage.

With above the structure (b), since a pressure of the oil is increased at the narrow portion, the oil gushes into the oil supply passage.

(c) The oil passage further includes a space between the other end surface of the gear in the axial direction, and an oil passage forming a surface of the case facing the other surface with a predetermined distance.

With above the structure (c), it will become possible to further increase the amount of the supplied oil, and to prevent the transferred oil from flowing out of the gear through both sides in the axial direction.

(d) The oil passage further includes a space between outer teeth of the gear, and an oil passage forming rib facing the outer teeth from a radially-outer side.

With above the structure (d), it will become possible to prevent the oil from flowing out of the gear through the space between the outer teeth to outside in the radial direction of the gear, and to further increase the amount of the supplied oil.

(e) The guide plate is attached to the oil passage forming rib.

With structure (e), it will become possible to attach the guide plate to a predetermined place without providing an exclusive mount portion for the guide plate.

(f) The gear transmission is to be provided in a vehicle, the gear is constructed so that a rotational direction of the gear during forward traveling of the vehicle is different from a rotational direction of the gear during rearward traveling of the vehicle. The gear has two sections divided by a vertical plane including an axis line of the gear, and the oil passage is disposed in one section in which the outer periphery of the gear moves upwardly during forward travel of the vehicle.

With above the structure (f), the oil will be efficiently supplied to the oil supply passage when the vehicle travels forwardly. By the way, forward travel of the vehicle is very often used compared to rearward travel.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE PREFERRED EMBODIMENTS

With reference to FIGS. 1 to 10, there will be described an apparatus for lubricating a rotating shaft according to a first embodiment of the present invention. It is to be noted that, for convenience of description, the forward and rearward directions of a vehicle will be referred to as forward and rearward directions of respective members, and, in the vehicle-widthwise direction, the left and right sides of the vehicle when viewed from a person riding in the vehicle (the left and right sides of the vehicle when viewed from behind the vehicle) will be referred to as left and right sides of the vehicle and the respective members.

Figure 1:
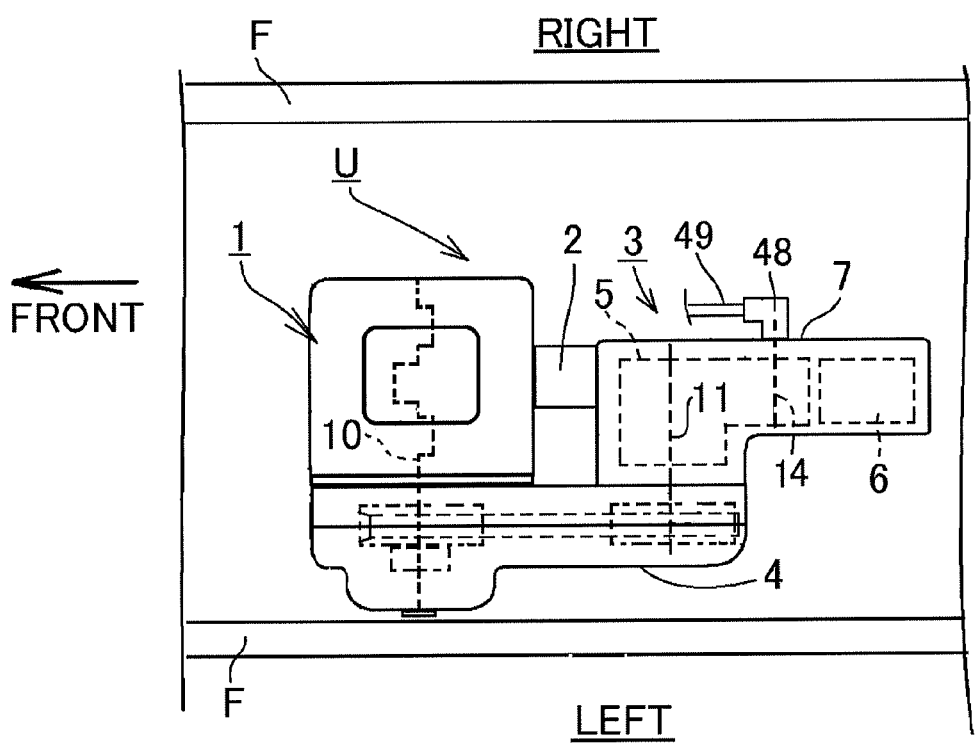
FIG. 1 is a plan view of a vehicle power unit including a transmission apparatus according to the present invention.

In FIG. 1, a power unit U for travel of a vehicle is mounted in a vehicle-body frame F of a utility vehicle, and includes an engine 1, a transmission apparatus 3 connected to a rear side of the engine 1 with a connecting bracket 2 interposed therebetween, and a V-belt type continuously variable transmission 4. The V-belt type continuously variable transmission 4 connects a crank shaft 10 in the engine 1 to an input shaft 11 in the gear transmission 3. The transmission apparatus 3 comprises a gear transmission 5, and a rear wheel final speed reducer 6 disposed behind the gear transmission 6, in a transmission case 7. The V-belt type continuously variable transmission 4 is mounted on the engine 1 and the gear transmission 3 such that the V-belt type continuously variable transmission 4 extends from a left side surface of the engine 1 to a left side surface of the transmission case 7.

Figure 2:
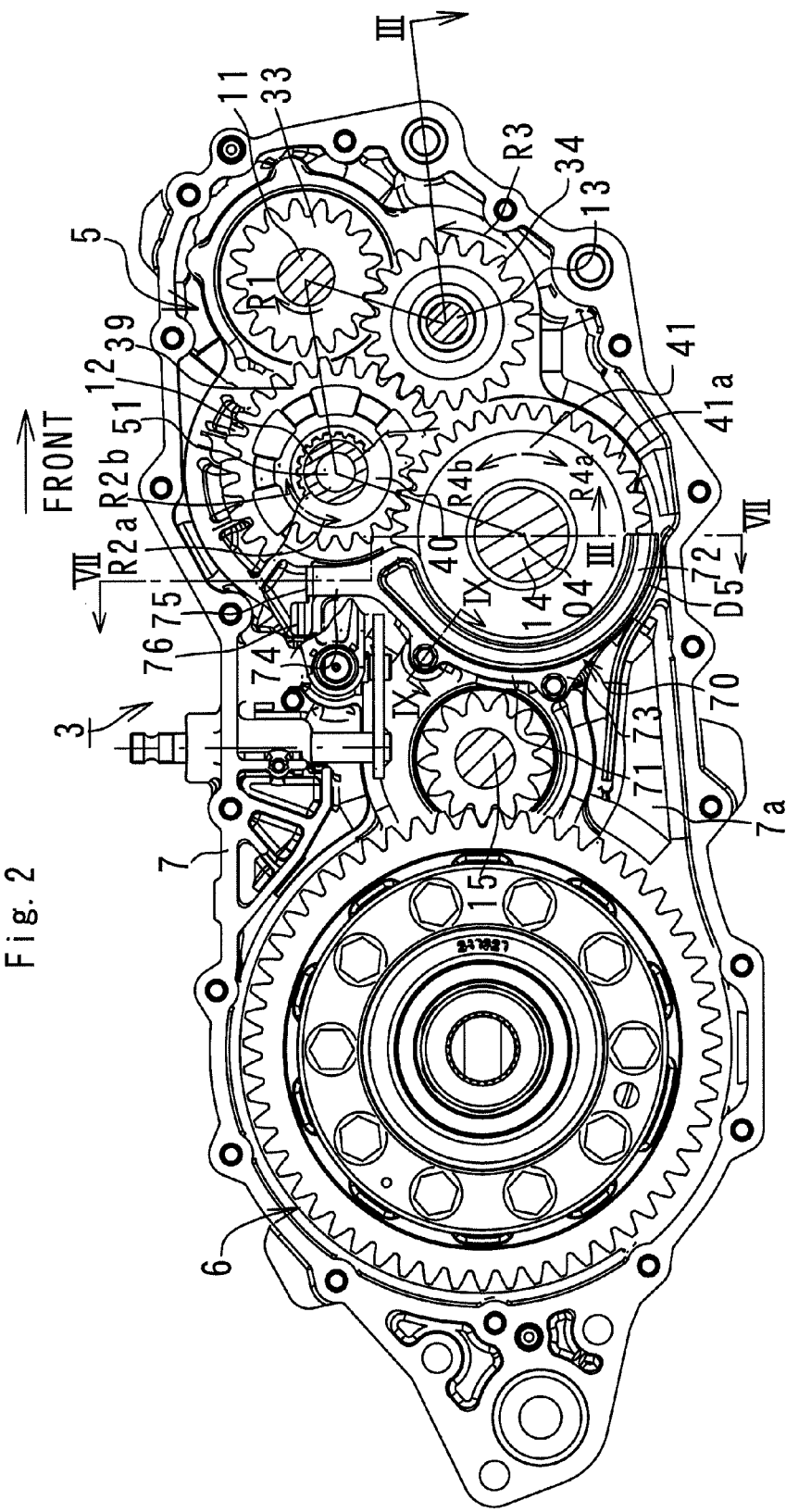
FIG. 2 is a vertical sectional enlarged view of the transmission apparatus in FIG. 1.

In FIG. 2, as speed change shafts, the input shat 11, a counter shaft 12, a reverse idler shaft 13, and a power take off shaft 14 for driving front wheels are provided in the transmission case 7. Moreover, an intermediate shaft 15 for the rear wheel final speed reducer 6 is also provided in the transmission case 7.

Figure 3:
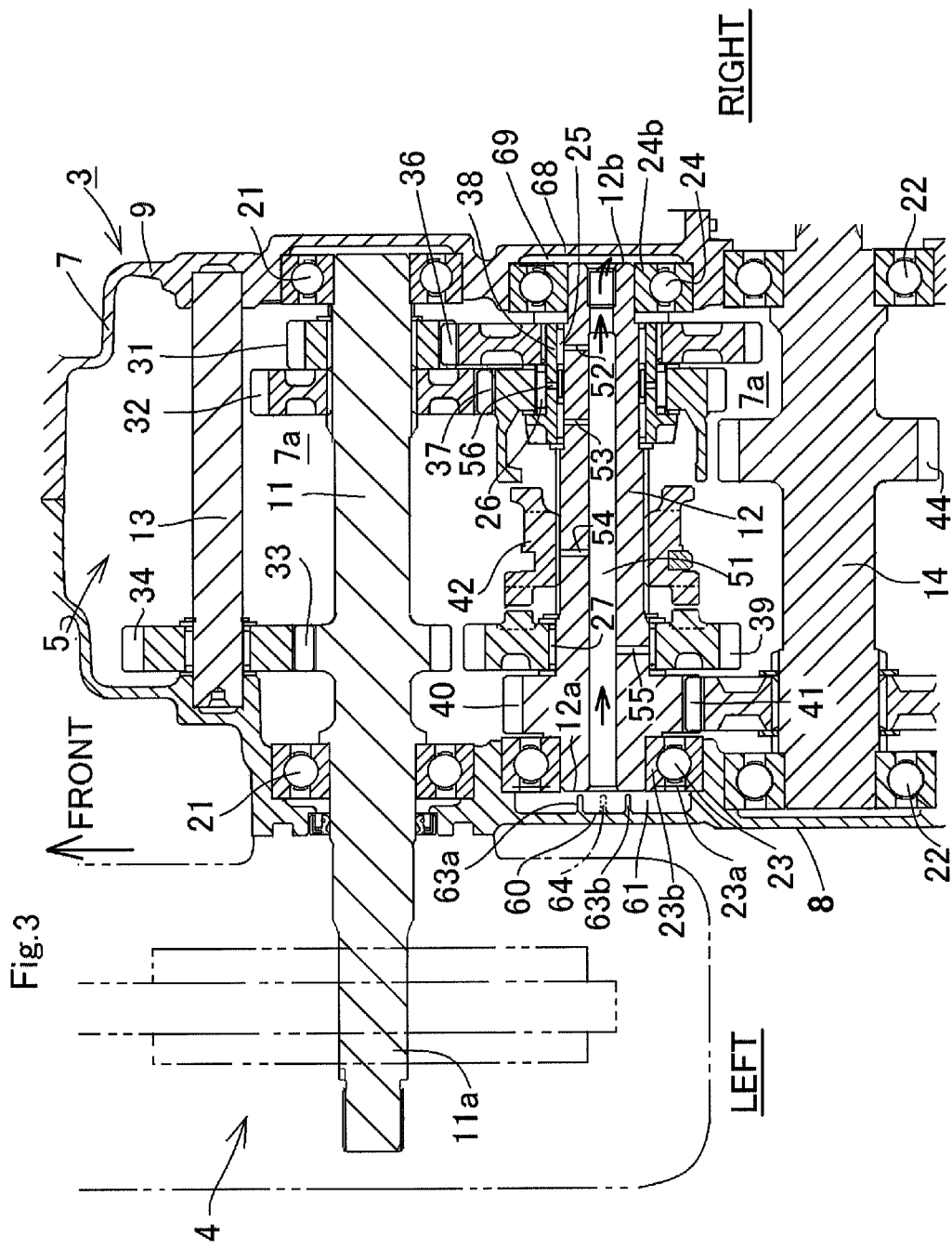
FIG. 3 is a cross-sectional enlarged view taken along III-III in FIG. 2.

In FIG. 3, the input shaft 11 is rotataby supported by the left side wall 8 and a right side wall 9 of the transmission case 7 with ball bearings 21 interposed therebetween, respectively. A left end portion of the input shaft 11 is protruded into a case of the V-belt-type continuously variable transmission 4 and is integrally provided with a driven pulley shaft 11a. An input low gear 31 for forward-traveling low-speed, and an input high gear 32 for forward-traveling high-speed are fixed to the input shaft 11 near its right end portion. An input reverse gear 33 is formed integrally with the input shaft 11 near a left end portion of the input shaft 11. The input reverse gear 33 engages with a reverse idle gear 34 which is free-rotatably fitted to the reverse idler shaft 13.

The counter shaft 12 is rotatably supported by the left side wall 8 and the right side wall 9 of the transmission case 7, with ball bearings 23 and 24 interposed therebetween, respectively. A counter low gear 36 engaging with the input low gear 31 and a counter high gear 37 engaging with the input high gear 32 are free-rotatably fitted thereto, near a right end portion of the counter shaft 12. The counter low gear 36 is fixed to an outer peripheral surface of a boss member 38 through spline fitting, and the boss member 38 is free-rotatably fitted to an outer peripheral surface of the counter shaft 12 with needle bearings 25 interposed therebetween. The counter high gear 37 is free-rotatably fitted to the outer peripheral surface of the boss member 38 with a needle bearing 26 interposed therebetween. Near the left end portion of the counter shaft 12, a counter reverse gear 39 engaging with the reverse idle gear 34 is free-rotatably fitted to the counter shaft 12, and an output gear 40 is formed integrally with the counter shaft 12.

The power take off shaft 14 is rotatably supported by the left side wall 8 and the right side wall 9 of the transmission case 7, with right and left ball bearings 22 and 22 interposed therebetween, respectively. A power take-off gear 41 engaged with the output gear 40 on the counter shaft 12 is spline-fitted on the power take off shaft 14 at a left end portion thereof such that the power take off gear 41 can't move in an axial direction. A lower end portion of the power take off gear 41 soaks in oil kept in a bottom of the transmission case 7. An intermediate gear 44 for driving rear wheels is formed integrally with the power take off shaft 14 for driving the front wheels.

A shift sleeve 42 is placed between the counter high gear 37 and the counter reverse gear 39. The shift sleeve 42 is spline-fitted on the outer peripheral surface of the counter shaft 12 such that the shift sleeve 42 can move in the axial direction. Three dog clutches are provided between the opposite end portions of the shift sleeve 42 in the axial direction, and the counter gears 36, 37 and 39, respectively. Namely, by moving the shift sleeve 42 in the axial direction through a shift operation mechanism (not shown), it becomes possible to perform changeovers among three speed-change stages, which are a forward-traveling high-speed state, a forward-traveling low-speed state, and a rearward-traveling state.

In FIG. 1, the power take-off shaft 14 is coupled, at its right end portion, to a front-wheel driving shaft 49, through a two-wheel-drive/four-wheel-drive changeover mechanism 48.

Lubricating Apparatus for the Counter Shaft

In FIG. 3, the counter shaft 12 includes an intra-shaft passage 51 extending in the axial direction in its shaft center line portion, and further includes a plurality of oil holes 52, 53, 54 and 55 extending in a radial direction. The intra-shaft oil passage 51 is opened at its opposite ends in the axial direction. Among the plurality of oil holes 52,53,54,55, the two oil holes 52 and 53 formed in the right-half portion of the counter shaft 12 are communicated with the needle bearing 25 on the inner periphery of the boss member 38, while the oil hole 54 formed in the counter shaft 12 in its middle portion in the axial direction is communicated with the spline-fitting portion in the inner periphery of the shift sleeve 42. The oil hole 55 formed in the counter shaft 12 near its left end portion is communicated with a needle bearing 27 on the inner periphery of the counter reverse gear 39. Further, the boss member 38 is provided with a sub oil hole 56 which penetrates therethrough in the radial direction, and the sub oil hole 56 communicates the needle bearing 25 on the inner periphery of the boss member 38 with the needle bearing 26 on the outer periphery thereof.

The left ball bearing 23 which supports the left end portion of the counter shaft 12 has a seal 23a at its left end portion. The seal 23a, an inner race 23b in the left ball bearing 23, a left end surface 12a of the counter shaft 12, and a concave portion 60 formed in the left side wall 8 of the transmission case 7 form or enclose an oil chamber 61. The intra-shaft oil passage 51 in the counter shaft 12 is opened, at its left end, to the oil chamber 61.

The right ball bearing 24 which supports the right end portion of the counter shaft 12 has no seal. An inner race 24b in the right ball bearing 24, a concave portion 68 formed in the right side wall 9 of the transmission case 7, and a right end surface 12b of the counter shaft 12 form or enclose an oil exhaust room 69. The oil exhaust room 69 is communicated with the inside of a transmission room 7a, through an inside of the right ball bearing 24.

Figure 5:
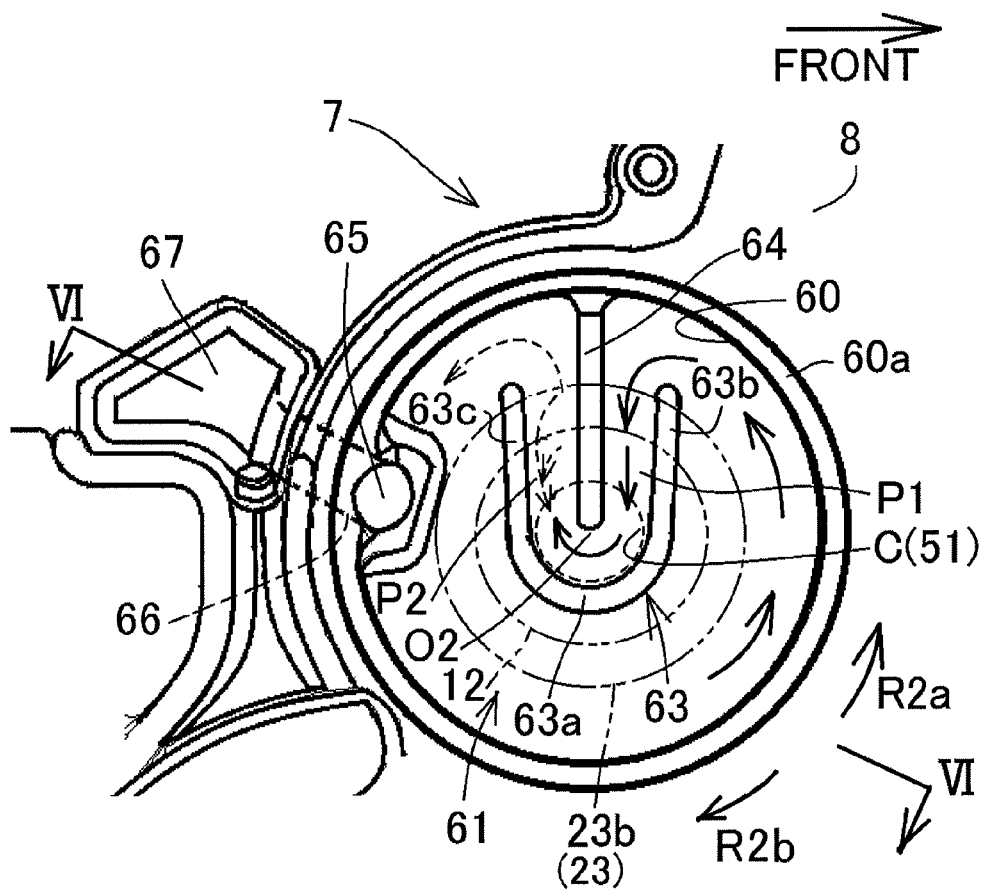
FIG. 5 is an inside view of an oil chamber.

In FIG. 5, the concave portion 60 formed in the left side wall 8 has a peripheral wall 60a formed in a substantially-circular shape. The oil chamber 61 has a center portion C which is substantially coincident, in size and position, with the intra-shaft oil passage 51 in the counter shaft 12. Further, the oil chamber 61 has an oil inlet 65 at its rear end portion, and the oil inlet 65 is communicated with an oil supply passage 66 formed in the left side wall 8. The oil supply passage 66 extends rearwardly and upwardly and is communicated with an oil intake room 67 formed posteriorly to a rear end of the peripheral wall 60a (outside the oil chamber 61).

First and second guide ribs 63 and 64 are provided within the oil chamber 61 in order to direct oil at outer radial portions, i.e. oil near the peripheral wall 60a, toward the center portion C, by utilizing a rotation of the counter shaft 12. The first and second guide ribs 63 and 64 are formed integrally with the left side wall 8. The first guide rib 63 has a bottom portion 63a and opposite side portions 63b and 63c. The bottom portion 63a is formed to have a half-circular shape which surrounds the center portion C at its lower side, when viewed in the axial direction. The opposite side portions 63b and 63c are formed to have a straight-line shape which extend upwardly from the opposite ends of the bottom portion 63a, when viewed in the axial direction. The entire first guide rib 63 is formed to have a substantially U shape. The opposite side portions 63b and 63c face, at their upper ends, the peripheral wall 60a, from a radially-inner side, with a certain distance interposed therebetween. The second guide rib 64 extends downwardly in a substantially-straight-line from the upper end portion of the peripheral wall 60a, further protrudes between the opposite side portions 63b and 63c of the first guide rib 63 and reaches the vicinity of the shaft center line O2 of the counter shaft 12. The entire second guide rib 64 is formed to have a substantially I shape. A first oil flow path P1 is formed between the second guide rib 64 and the front side portion 63b of the first guide rib 63, and a second oil flow path P2 is formed between the second guide rib 64 and the rear side portion 63c of the first guide rib 63. The first oil flow path P1 and the second oil flow path P2 extend downwardly from the upper end of the oil chamber 61 and encounter each other at the center portion C.

Figure 6:
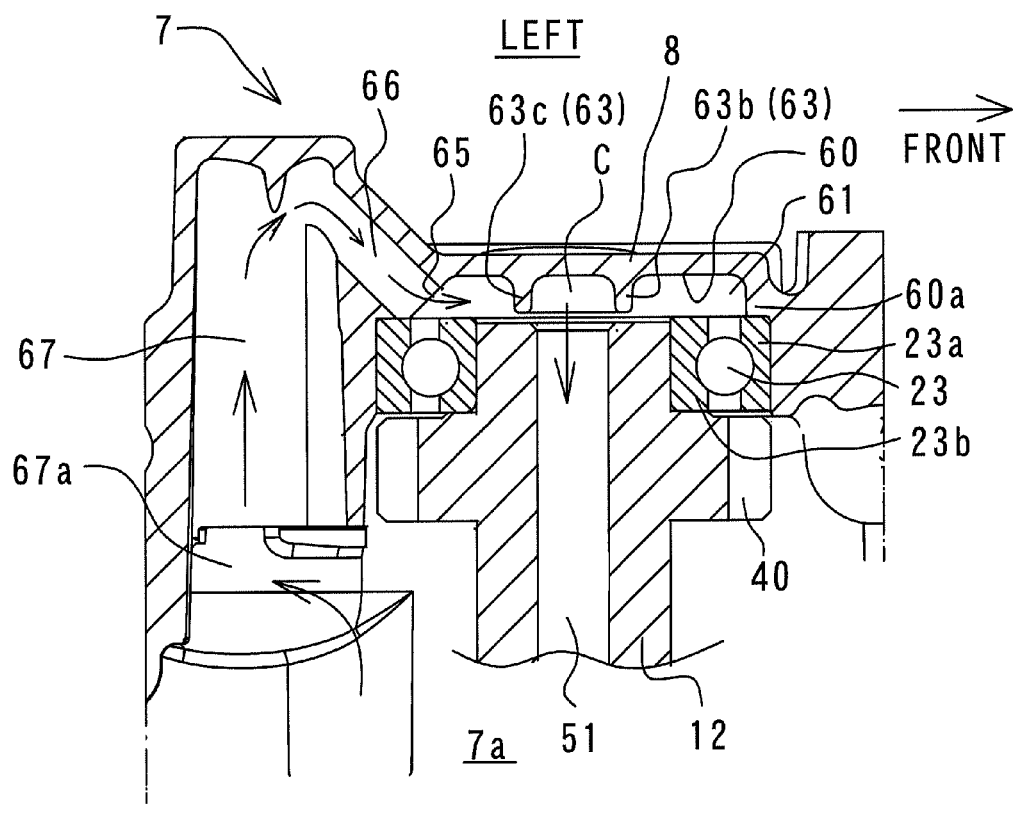
FIG. 6 is a cross-sectional view taken along VI-VI in FIG. 5.

In FIG. 6, the oil intake room 67 extends rightwardly through the left side wall 8, and the oil intake room 67 is provided, in its right end portion, with an oil receiver portion 67a having an upper surface which is open to the transmission room 7a.

Figure 4:
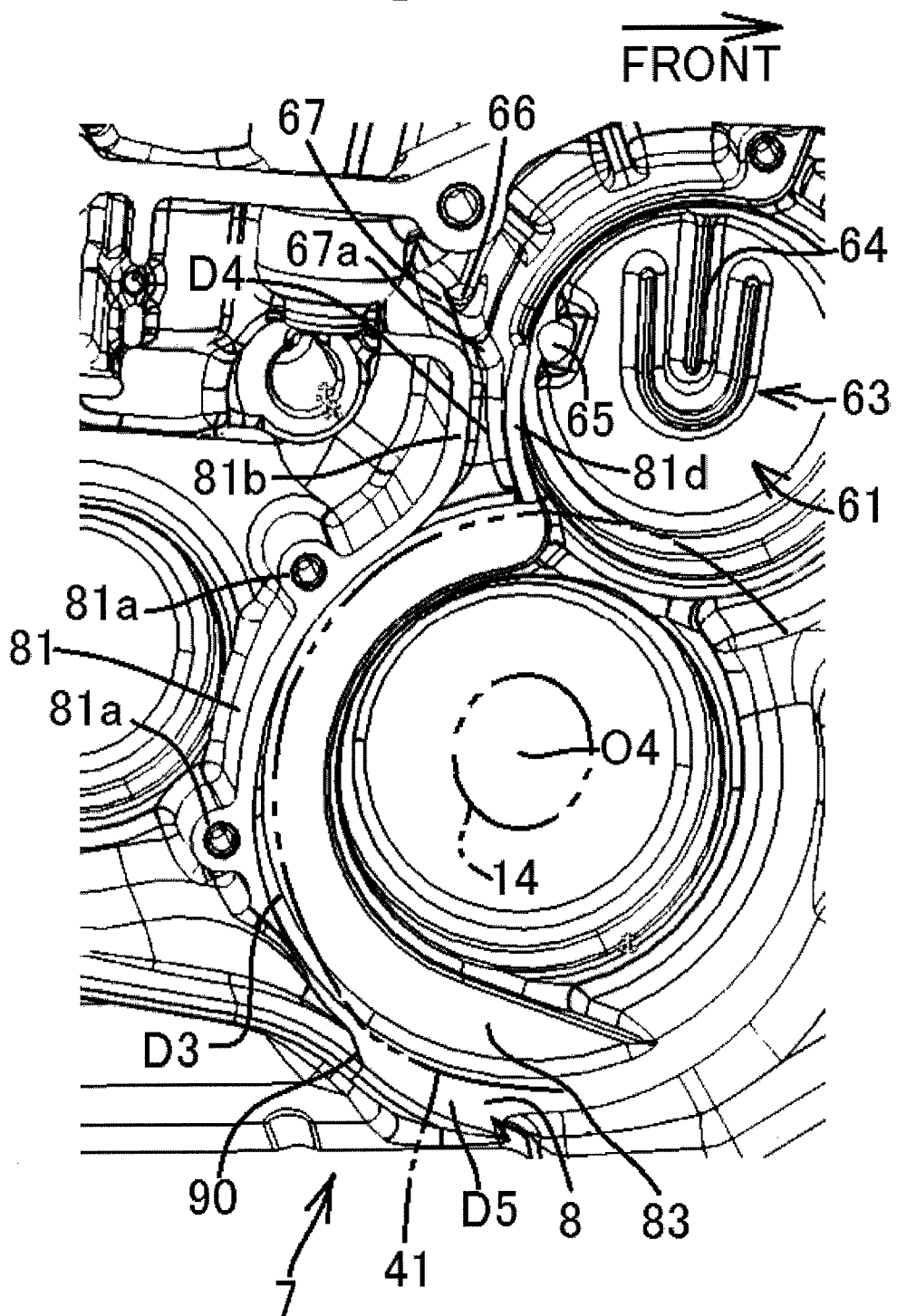
FIG. 4 is an inside view (right side view) of the left wall of a transmission case.

In FIG. 4, an oil passage forming rib 81 is formed in the left side wall 8 of the transmission case 7, and the oil passage forming rib 81 is protruded rightward. The oil passage forming rib 81 is formed to have an arc-shape such that the oil passage forming rib 81 faces an outer edge of the power take off gear (shown by a chain double dashed line) 42 by a predetermined distance from an outside in the radial direction. A right end surface of the oil passage forming rib 81 serves as a plate mounting surface, and is perpendicular to a shaft center line of the power take off shaft 14. A guide plate 70 described below (see FIG. 2) is mounted on the plate mounting surface. The oil passage forming rib 81 extends downwardly from an upper end portion of the power take off gear 41 so as to pass a vicinity of a rear end portion of the power take off gear 41. However, a lower end of the oil passage forming rib 81 does not reach to a lower end portion of the power take off gear 41. The oil passage forming rib 81 comes to an end at an intermediate position between the lower end portion of the power take off gear 41 and the rear end portion thereof. A pair of mounting boss portions 81a is formed in a rear surface of the oil passage forming rib 81, and each of the mounting boss portions 81a has a female screw. An extended rib 81b is integrally formed in the oil passage forming rib 81 at its upper end, and extends upwardly to the oil receiver portion 67a. Further an upper additional rib 81d is formed in the oil passage forming rib 81 such that the upper additional rib 81d faces the extended rib 81b from a forward side, by a predetermined distance.

A lower rib 90, different from the oil passage forming rib 81, is formed in the left side wall 8 of the transmission case 7. The lower rib 90 is located under the oil passage forming rib 81, and faces a rear-lower portion from outside in the radial direction with a predetermined distance.

Further, an oil passage forming surface 83 is formed on the left side surface 8 of the transmission case 7. The oil passage forming surface 83 is formed to have an arc shape (half circular shape) along a certain circle as a center which is the shaft center line O4 of the power take off shaft 14. The oil passage forming surface 83 is included in a plane which is perpendicular to the shaft center line O4 of the power take off shaft 14, and faces an outer portion of the power take off gear 44 from a left side.

Figure 8:
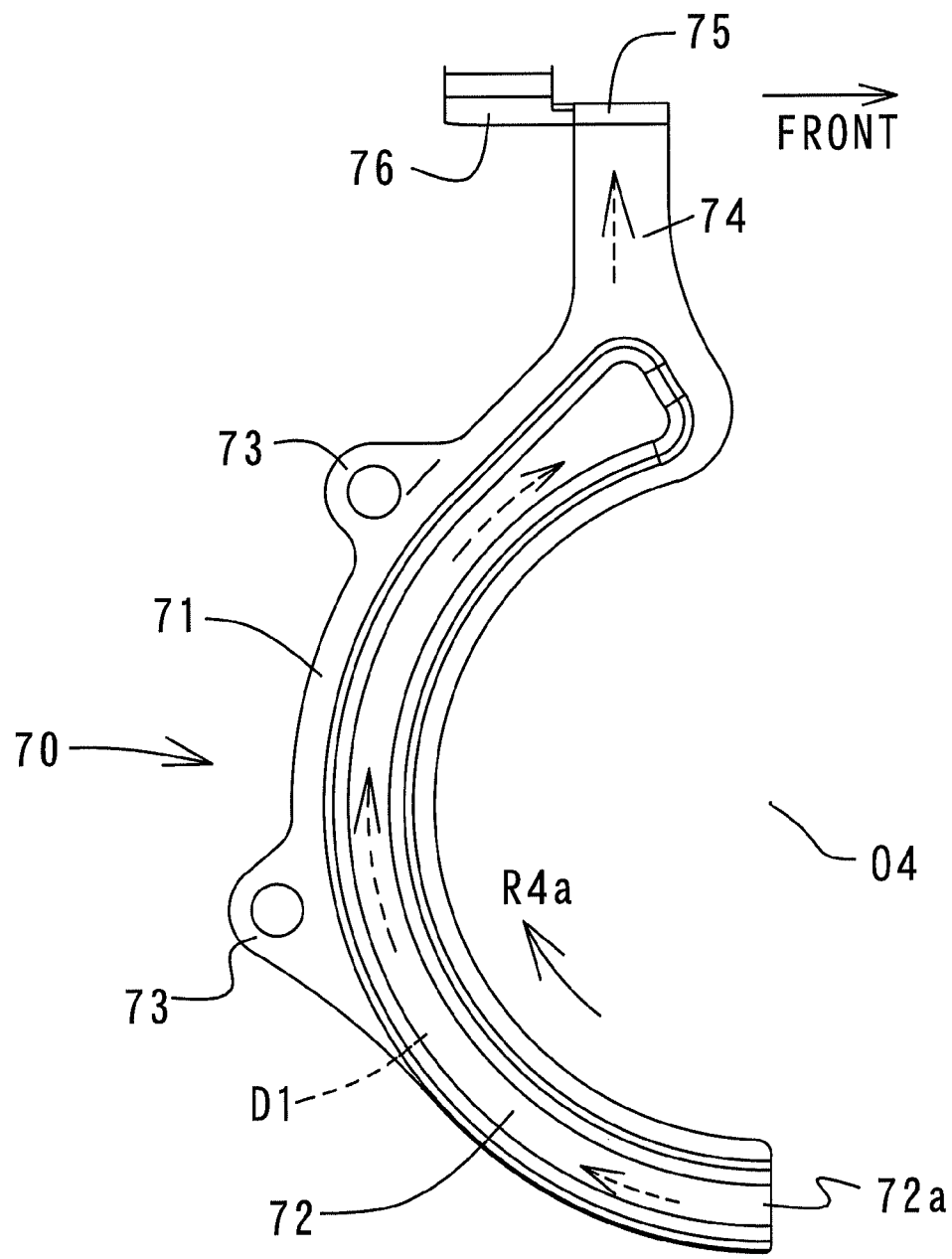
FIG. 8 is a right side view of a guide plate in FIG. 2.

FIG. 8 shows the guide plate 70 for forming an oil passage including a first oil passage D1. The guide plate 70 integrally has a plate body 71, an upper extended portion 74, an upper wall portion 75, and a canopy or roof portion 76. The plate body 71 is formed to have an arc-shape (substantially half-circle shape) such that the plate body 71 is protruded rearward, in side view. The upper extended portion 74 is linearly-extended upward from an upper end of the plate body 71. The upper wall portion 75 is bended leftward from an upper end of the upper extended portion 74. The roof portion 76 is formed on a left side of the upper wall portion 75, and is extended rightward. The upper and lower mounted surfaces 73 are formed on a rear end surface of the plate body 71. Further, a recess portion 72 for expanding the oil passage is formed in the plate body 71. The recess portion 72 is extended over an entire length of the plate body 71 from a lower end to an upper end of the plate body 71. The recess portion 72 is protruded rightward from the plate body 71, and a lower end 72a of the recess portion 72 is opened forwardly.

Figure 9:
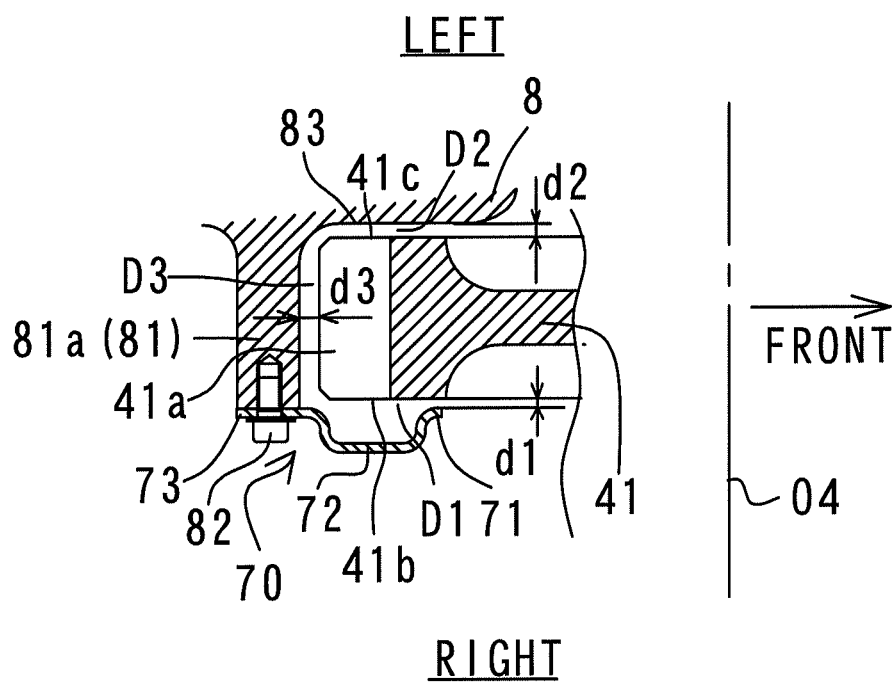
FIG. 9 is a cross-sectional view taken along IX-IX in FIG. 2.
Figure 10:
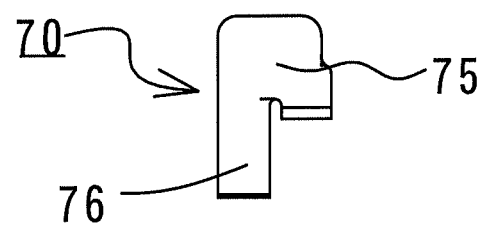
FIG. 10 is a plan view of an upper end of the guide plate in FIG. 8.
Figure 11:
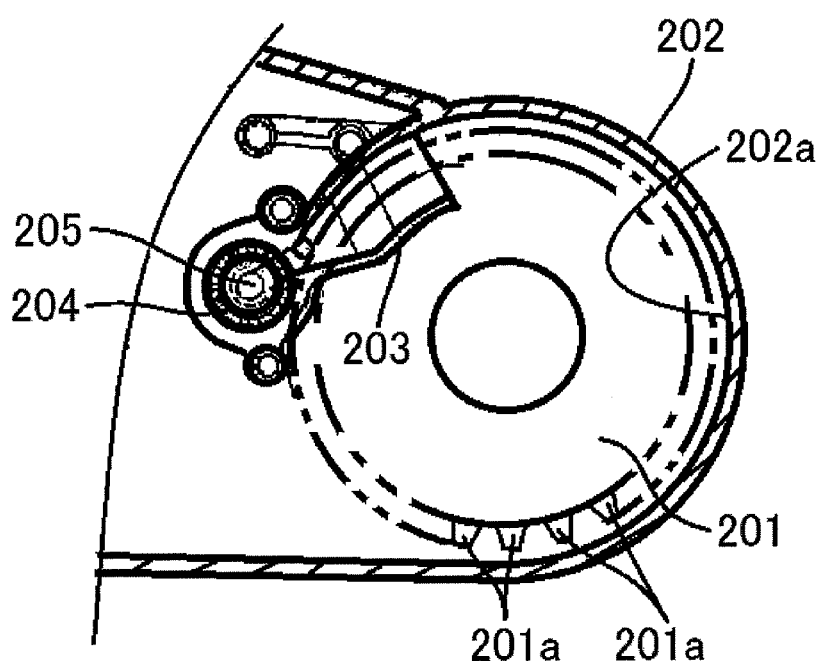
FIG. 11 is a cross-sectional view of a conventional example (Prior Art).

In FIG. 9, the oil passage according to the present invention includes the first oil passage D1, a second oil passage D2, and a third oil passage D3. The first oil passage D1 is constituted by a space between a right end surface 41b of the outer peripheral portion of the power take off gear 41 and the plate body 71 facing the right end surface 41b from a right side. The second oil passage D2 constituted by a space between a left end surface 41c of the outer peripheral portion of the power take off gear 41 and an oil passage forming surface 83 of the left side wall 8 facing the left end surface 41c from a left side. The third oil passage D3 constituted by a space between an outer peripheral end of the outer teeth 41a of the power take off gear 41 and an inner surface of the oil passage forming rib 81. The first, the second and the third oil passages D1, D2, and D3 are placed in a rear side of the shaft center line O4 of the power take off gear 41, and are formed to have a substantial arced-shape in a side view.

A construction of the oil passage including the first, the second and the third oil passages D1, D2, and D3 will be described in detail as follows. Each of the mounted portions 73 is fixed to the mounting boss portions 81a of the oil passage forming rib 81 by means of a bolt 82. The plate body 71 covering the first oil passage D1 is located in the plane which is perpendicular to the center line O4 of the power take off gear 41, and faces the right end surface the power take off gear 41b of the outer peripheral portion of the power take off gear 41 with a predetermined clearance d1 (for example, 1 mm) in the axial direction. The clearance d1 is not changed between the bottom end of the power take off gear 41 and the top end thereof. The first oil passage D1 is constituted by the clearance d1 and an inner space of the recess portion 72. The recess portion 72 has, for example, a depth of 3.2 mm in the axial direction.

The oil passage forming surface 83 covering the second oil passage D2 faces the left end surface 41c of the power take off gear 41 with a certain distance d2 (for example, 1.5 mm). The clearance d2 is not changed between the bottom end of the power take off gear 41 and the top end thereof.

The oil passage forming rib 81 covering the third oil passage D3 faces the outer peripheral end of the outer teeth 41a of the power take off gear 41 with a distance d3 (for example, 2 mm~5 mm) in the radial direction. The clearance D3, preferably, is formed such that a bottom end of the third oil passage D3 has the broadest sectional area, and the sectional area becomes narrow as a position of the sectional area raises. Needless to say, it is possible that the clearance d2 is not changed between a bottom end of the third oil passage D3 and a top end thereof.

Figure 7:
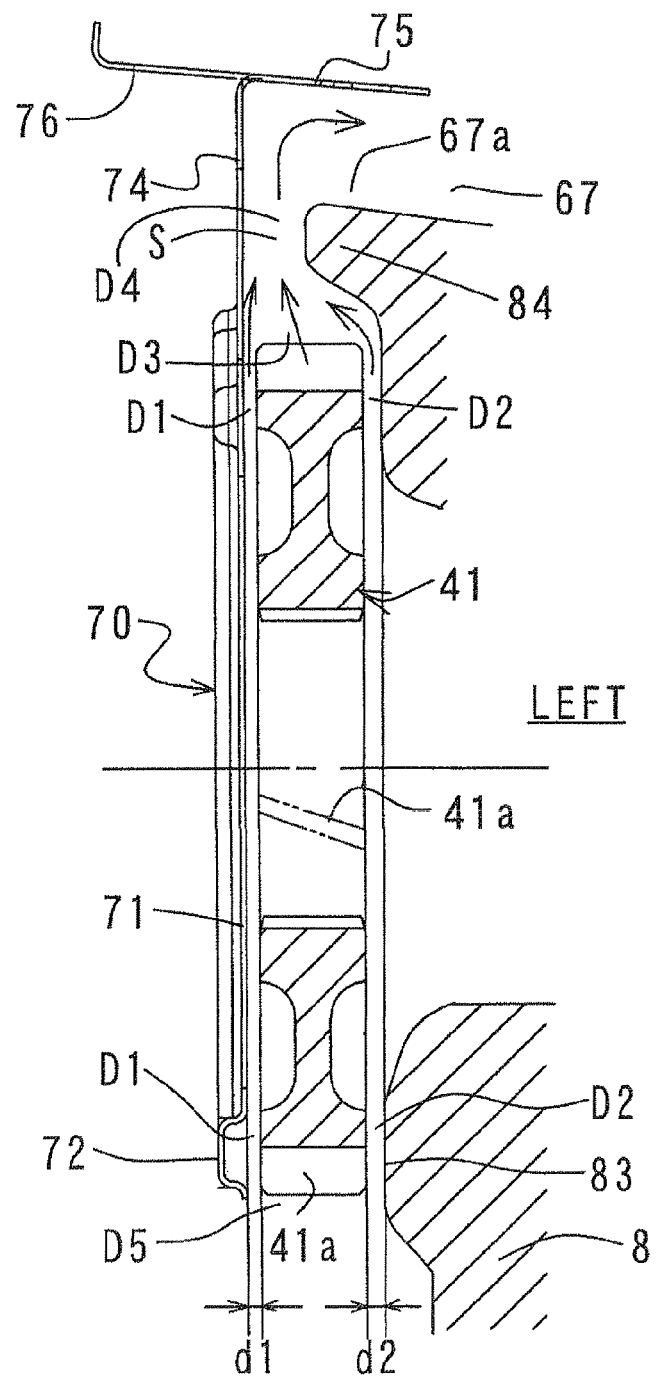
FIG. 7 is a cross-sectional view taken along VII-VII in FIG. 2.

In the present embodiment, as shown in FIG. 7, the oil passage further includes an extended oil passage D4 located above an upper end of the power take off gear 41, in addition to the first, second and third passages D1, D2, and D3. The extended oil passage D4 is enclosed by the left side wall 8 and an upper extended portion 74 of the guide plate 70, and is extended upward straightly from the upper end of the power take off gear 41. However, the left side wall 8 has a projecting portion 84 projecting into the extended oil passage D4 so as to provide a narrow portion S in the extended oil passage D4. A lower end portion of the extended oil passage D4 is communicated with upper ends of the first, the second and the third oil passages D1, D2, and D3. An upper end portion of the extended oil passage D4 is communicated with the oil receiver portion 67a of the oil intake room 67.

The upper wall portion 75 of the guide plate 70 is extended leftward above an upper space of the extended oil passage D4, and reaches above the oil receiver portion 67a. Therefore, the upper wall portion 75 can guide oil spewed upward from the narrow portion S into the oil receiver portion 67a located in the left side. Additionally, the roof portion 76 can guide oil-mist from an outside into the oil receiver portion 67a. Especially, the roof portion 76 guides the oil-mist occurring at a reverse rotating of the transmission into the oil receiver portion 67a. The upper wall portion 75 and the roof portion 76 are inclined at a slight angle to the horizontal plane so that the upper wall portion 75 and the roof portion 76 become lower toward a left side.

The power take off gear 41 is constituted by a helical gear. Therefore, when the power take off gear 41 rotates in a positive rotational direction R4a (see FIG. 2) for forward traveling of the vehicle, the helical teeth 41a press the oil toward the guide plate 70 (toward the right side). Meanwhile, when the power take off gear 41 rotates in a reverse rotational direction R4b (see FIG. 2) for rearward traveling of the vehicle, the helical teeth press the oil toward the left side wall 8.

In present embodiment, as shown in FIGS. 2 and 4, the oil passage further includes a lower oil passage D5 communicated with a lower end portion of the third oil passage D3. The lower oil passage D5 is constituted by a space between the outer periphery of a rear-lower portion of the power take off gear 41 and the lower rib 90.

Operation of the Embodiment

In FIG. 2, the input shaft 11 is rotated in a direction of an arrow R1, regardless of whether the vehicle is traveling forwardly or rearwardly. The counter shaft 12 is rotated in a direction of an arrow R2a (in a positive rotational direction) during forward travel, and is rotated in a direction of an arrow R2b (in a reverse rotational direction) during rearward travel. The power take off shaft 14 is rotated in a direction of an arrow R4a (in a positive rotational direction) during forward travel, and is rotated in a direction of an arrow R4b (in a reverse rotational direction) during rearward travel. The reverse idle gear 34 is rotated in a direction of an arrow R3, regardless of whether the vehicle is traveling forward or rearward.

When the vehicle is traveling forwardly, the counter shaft 12 is rotating in the direction of the arrow R2, and oil in the bottom space of the transmission room 7a is taken in the first, second, third passages D1, D2, and D3 (FIG. 8), and the lower passage D5 (FIG. 5) at the bottom portion of the power take off gear 41. Then, the oil is moved upward in the first, the second, and the third passages D1, D2, and D3 in an arc-shape, along the outer peripheral portion of the power take off gear 41.

In FIG. 7, the oil moved upward to the top end portion of the power take off gear 41 flows into the extended passage D4, and is pressurized in the narrow portion S to be sprayed upward.

The oil spewed upward is thrown into the oil receiver portion 67a, and then flows into the oil intake room 67.

In FIG. 5, the oil temporarily accumulated in the oil intake room 67 flows forward-downward throughout the oil supply passage 66 to the oil chamber 61 by gravity (water head differential).

When the vehicle is traveling forwardly, the counter shaft 12 is rotating in the direction of the arrow R2a, and the oil within the oil chamber 61 moves in the direction of the arrow R2a by rotations of the counter shaft 12 and the inner race 23b in the bearing 23, and is pressed against the inner surface of the peripheral wall 60a due to centrifugal forces. At the upper end portion of the front-half portion of the oil chamber 61, the oil impinges on the front surface of the second guide rib 64 at its upper portion, from a front side thereto, and the oil is guided inwardly in the radial direction by the second guide rib 64, and thus, flows toward the center portion C through the first oil flow path P1. The oil having reached the center portion C turns upwardly in a U shape at the bottom portion 63a and tries to flow upwardly through the second oil flow path P2.

On the other hand, at the upper end portion of the rear-half portion of the oil chamber 61, as indicated by broken-line arrows, a portion of the oil impinges on the upper end portion of the rear side portion 63c of the first guide rib 63, from a front side thereto, and is guided toward the center portion C through the second oil flow path P2, due to the rotations of the counter shaft 12 and the inner race 23b in the bearing 23 in the direction of the arrow R2a.

The first oil flow having passed through the first oil flow path P1 and turned in an U shape at the bottom portion 63a, and the second oil flow flowing downwardly through the second oil flow path P2 impinge on each other halfway through the second oil flow path P2, which increases the pressures at the position of this impingement and in a vicinity thereof.

The oil having been increased in pressure at the position of the impingement and in the vicinity thereof as described above is efficiently supplied to the inside of the intra-shaft oil passage 51 from the center portion C of the oil chamber 61.

In FIG. 3, the oil having been supplied to the inside of the intra-shaft oil passage 51 in the counter shaft 12 from the oil chamber 61 flows rightward through the intra-shaft oil passage 51. Further, halfway therethrough, the oil is supplied to respective lubricating portions through the respective oil holes 52, 53, 54 and 55 to lubricate the respective lubricating portions. Namely, the oil flowing into the leftmost oil hole 55 is supplied to the needle bearing 27 on the counter reverse gear 39, the oil flowing into the axially-middle oil hole 54 is supplied to the spline-fitting portion in the shift sleeve 42, and the oil flowing into the right two oil holes 52 and 53 is supplied to the needle bearing 25 on the inner side of the boss member 38. Further, the oil flowing into the oil hole 56 in the boss member 38 is supplied to the needle bearing 26 on the counter high gear 37.

The oil having reached the right end of the intra-shaft oil passage 51 without flowing into the respective oil holes 52, 53, 54 and 55 is exhausted to the oil exhaust room 71 through the right-end opening of the intra-shaft oil passage 51, further passes through the right ball bearing 24 and is returned to the transmission room 7a.

Referring to FIG. 2, when the vehicle is traveling rearward, the counter shaft 12 is rotating in the direction of an arrow R2b, and the power take off shaft 14 and the power take off gear 41 are rotating in the direction of the arrow R4b.

The oil within the transmission room 7a is scraped forward-upward by the outer teeth 41a of the power take off gear 41. Some of the scrapped oil is sprayed upwardly along the outer periphery of the power take off gear 41 at the front-half region thereof, impinges on the upper wall portion 75 and roof portion 76, and, then, is supplied in the oil receiver portion 67a.

The amount of oil supplied in the oil receiver portion 67a by the rotation of the power take off gear 41 in the direction of the arrow R4b is less than the amount of oil by the rotation of the power take off gear 41 in the direction of the arrow R4a. However, rearward-traveling of the vehicle has a very low frequency of usage compared with forward-traveling of the vehicle, and rotational rate of the power take off gear 41 during the rearward-traveling is low compared with rate during the forward-traveling. Therefore, oil shortage does not occur.

In FIG. 5, the oil, which is supplied in the oil chamber 61 through the oil supply passage 66, is moved in the same direction as the arrow R2b of rotations of the counter shaft 12 and the inner race 23b in the bearing 23, and is pressed against the inner surface of the peripheral wall 60a due to centrifugal forces. During rearward traveling, the counter shaft 12 is rotating in the opposite direction from that during forward traveling, and therefore, the oil is flowing in the opposite direction. Accordingly, during rearward traveling, the second oil flow path P2 performs the function of the first oil flow path P1 during forward traveling. Further, during rearward traveling, the first oil flow path P1 performs the function of the second oil flow path P2 during forward traveling. Accordingly, the first and second oil flows impinge on each other halfway through the first oil flow path P1 to be increased in pressure, and thus are efficiently supplied to the inside of the intra-shaft oil passage 51 in the counter shaft 12.

Effects of the Embodiment (1) Since the first oil passage D1 is constituted by the space between the right end surface 41b of the outer peripheral portion of the power take off gear 41 and the plate body 71, it becomes possible to increase the amount of the supplied oil. In addition, during transfer of the oil, it becomes possible to prevent the transferred oil from flowing out of the power take off gear 41 through both the sides in the axial direction, and the oil transfer efficiency will become high.

(2) Since the guide plate 70 includes the recess portion 72 for expanding the oil passage 72, which extends along the first oil passage D1 in an arc, it becomes possible to increase the amount of the supplied oil.

(3) Since the extended oil passage D4 positioned above the first, second and third oil passages D1, D2, and D3 has the narrow portion S, the pressure of the oil is increased at the narrow portion S, and the oil gushes into the oil receiver portion 67a.

(4) The second oil passage D2 is constituted by the space between the left end surface 41c of the power take off gear 41 and the oil passage forming surface 83 of the transmission case 7a, and the third oil passage D3 is constituted by the space between the outer teeth 41a of the power take off gear 41 and the oil passage forming rib 81 facing the outer teeth 41a from the outside in the radial direction. Therefore, the oil passage will be efficiently formed by utilizing the outer portion of the power take off gear 41, and the amount of the supplied oil will be increased.

(5) Since the guide plate 70 is attached to the oil passage forming rib 81, it will become possible to attach the guide plate 70 to the predetermined place without providing an exclusive mount portion for the guide plate 70.

(6) The power take off gear 41 has two sections divided by the vertical plane including an axis line of the power take off gear 41, and the first, second and third oil passages D1, D2, and D3 are placed in the one section, i.e. in the rear section, in which the outer periphery of the power take off gear 41 moves upwardly during forward traveling of the vehicle. Therefore, the oil will be efficiently supplied to the oil receiver portion 67a when the vehicle travels forwardly. By the way, forward traveling of the vehicle is very often used compared to rearward traveling.

OTHER EMBODIMENTS (1) In the present invention, the gear composing the oil passage is not limited to a helical gear. A spar gear may be used in the present invention.

(2) In the present invention, the rotating shaft is not limited to the power take off gear of the transmission. A speed change input shaft, a counter shaft and the like may be applied.

(3) The present invention is not limited to the structures according to the embodiments and is intended to cover various modified embodiments conceived without departing from the contents defined in the claims.

What is claimed is:

1. A transmission apparatus comprising:
a case;
a gear transmission housed in the case;
an intra-shaft oil passage formed in at least one rotating shaft of the gear transmission;
an oil supplying passage for supplying oil to the intra-shaft oil passage;
a guide plate facing one end surface in an axial direction of a gear with a predetermined distance in the axial direction of the gear, the gear being dipped into the oil in the case; and
an oil passage formed between the one end surface and the guide plate, the oil passage extending along an outer peripheral portion of the one end surface,
wherein the guide plate includes a recess portion for expanding the oil passage, and the recess portion is formed in an arc-like shape so as to extend along the oil passage.

2. The transmission apparatus as claimed in claim 1, wherein the oil passage includes a narrow portion on an upper end of the oil passage, and the upper end is communicated with the oil supply passage.

3. The transmission apparatus as claimed in claim 1, wherein the oil passage further includes a space between the other end surface of the gear in the axial direction, and an oil passage forming surface of the case facing the other surface with a predetermined distance or interval.

4. The transmission apparatus as claimed in claim 1, wherein the oil passage further includes a space between outer teeth of the gear, and an oil passage forming rib facing the outer teeth from a radially-outer side.

5. The transmission apparatus as claimed in claim 4, wherein the guide plate is attached to the oil passage forming rib.

6. The transmission apparatus as claimed in claim 4, wherein:
the gear transmission is to be provided in a vehicle:
the gear is constructed so that a rotational direction of the gear during forward traveling of the vehicle is different from a rotational direction of the gear during rearward traveling of the vehicle;
the gear has two sections divided by a vertical plane including an axis line of the gear; and
the oil passage is disposed in one section in which the outer periphery of the gear moves upwardly during forward traveling of the vehicle.

\* \* \* \* \*